Figure 1:
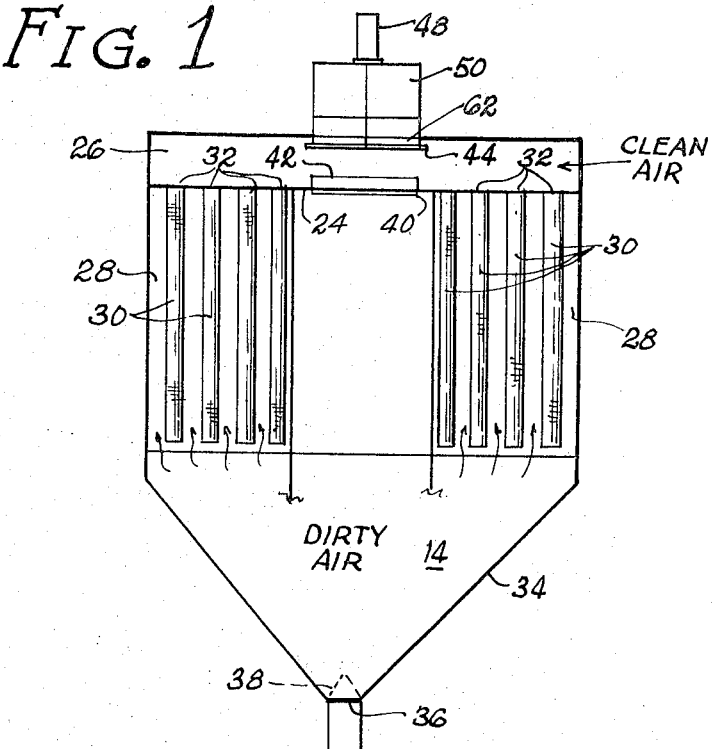

United States Patent [19]
Smith et al.

[11] 3,861,893
[45] Jan. 21, 1975

[54] FILTER DEVICE WITH SCAVENGER SYSTEM

[75] Inventors: Donald W. Smith; Fredric W. Prill, both of Aurora, Ill.

[73] Assignee: Barber-Greene Company, Aurora, Ill.

[22] Filed: Sept. 5, 1972

[21] Appl. No.: 286,215

[52] U.S. Cl.................... 55/302, 55/340, 55/341, 55/467, 55/484
[51] Int. Cl............................................ B01d 45/18
[58] Field of Search ....... 55/96, 272, 288, 302, 341, 55/338-340, 467, 484; 210/333

[56] References Cited
UNITED STATES PATENTS

| | | |
|---|---|---|
| 3,383,840 | 5/1968 | Johnson et al........................ 55/341 |
| 3,680,285 | 8/1972 | Wellan et al.......................... 55/302 |
| 3,699,747 | 10/1972 | Kroll........................................ 55/96 |
| 3,726,066 | 4/1973 | Colley et al............................ 55/302 |
| 3,735,566 | 5/1973 | Laliwala............................ 55/302 X |

Primary Examiner—Frank W. Lutter
Assistant Examiner—Kathleen J. Prunner

[57] ABSTRACT

A filter system for separation of particulates from gaseous material which makes use of a filter medium from which the collected filter cake is periodically removed, the improvement wherein the gas filtering through the filter medium during the cleaning cycle and for a short period thereafter is scavenged to prevent release into the atmosphere and/or return for a refiltering operation.

7 Claims, 3 Drawing Figures

FILTER DEVICE WITH SCAVENGER SYSTEM

This invention relates to a filter device for the removal of dust, dirt and other solid particles from air or other gaseous media and it relates more particularly to a filter device which makes use of a plurality of filter elements in the form of filter bags or tubes formed of porous filter fabric, on which the dirt, dust or other solid particles are separated to form a filter cake as the filtered air is drawn therethrough in response to subatmospheric pressure on the opposite side of the filter tube.

When the accumulation of dirt or dust, separated from the air or other gaseous media onto the walls of the filter fabric, becomes so excessive as to form a filter cake which interferes with the efficiency in operation of the filter device, it becomes necessary to clean the tubes by removal of the filter cake from the walls of the filter fabric.

Filter cake removal can be accomplished in a number of ways. By one technique normal filter flow is stopped while an apparatus is activated to shake the filter bags. This loosens the filter cake which falls gravitationally from the bag into a collector at the bottom of the filter housing for subsequent removal. When the shaking operation has been completed for filter cake removal, the filter cycle is renewed with normal filter flow.

By another technique, normal filter flow is stopped while a burst of air or other gas is introduced into the open end of the filter tube for travel as a bubble through the length of the filter tube. This causes flexure of the filter fabric and loosening of the filter cake which falls gravitationally from the ingoing side of the filter fabric into the collector at the bottom of the filter housing. Normal filter flow is renewed after removal of the filter cake.

A still further technique makes use of reverse flow whereby normal filter flow is terminated and air or gas under positive pressure is caused to flow through the filter surface in the reverse direction to more or less displace the filter cake from the filter surface whereupon it falls gravitationally to the collector at the bottom of the filter housing. Again normal filter flow is renewed after filter cake removal.

All of the preceding require termination of normal filter flow during cleaning to effect removal of the filter cake formed on the ingoing side of the filter bag. By a more recent technique which makes use of a jet pulse principle, filter cake removal without shutting off normal filter flow has been achieved by injecting a pulse of air or gas at a pressure which far exceeds the pressure of normal filter flow whereby the jet pulse introduced into the open end of the filter bag causes flexure throughout the length of the bag for filter cake removal without stopping normal filter flow.

Filter cake removal by the techniques described or any other techniques leaves the filter surface of the freshly cleaned bag initially sufficiently open so that a substantial amount of dirt or dust finds its way through the filter surface at least during the initial portions of the renewed filter cycle and possibly during the cleaning cycle, depending somewhat on the cleaning technique. Such dirt, dust or other contaminants are thus undesirably included in the filtered air or gas.

It is an object of this invention to provide a method and means for preventing the exhaust of gas filtered during and immediately following the cleaning cycle and it is a related object to provide a method and means for scavenging that portion of gas filtered during and immediately following the cleaning cycle to effect removal of unfiltered dirt and dust particles which otherwise remain entrained in the filtered gas stream during and immediately following the cleaning cycle, thereby to prevent the exhaust of unclean gas or air into the atmosphere or otherwise.

Figure 2:
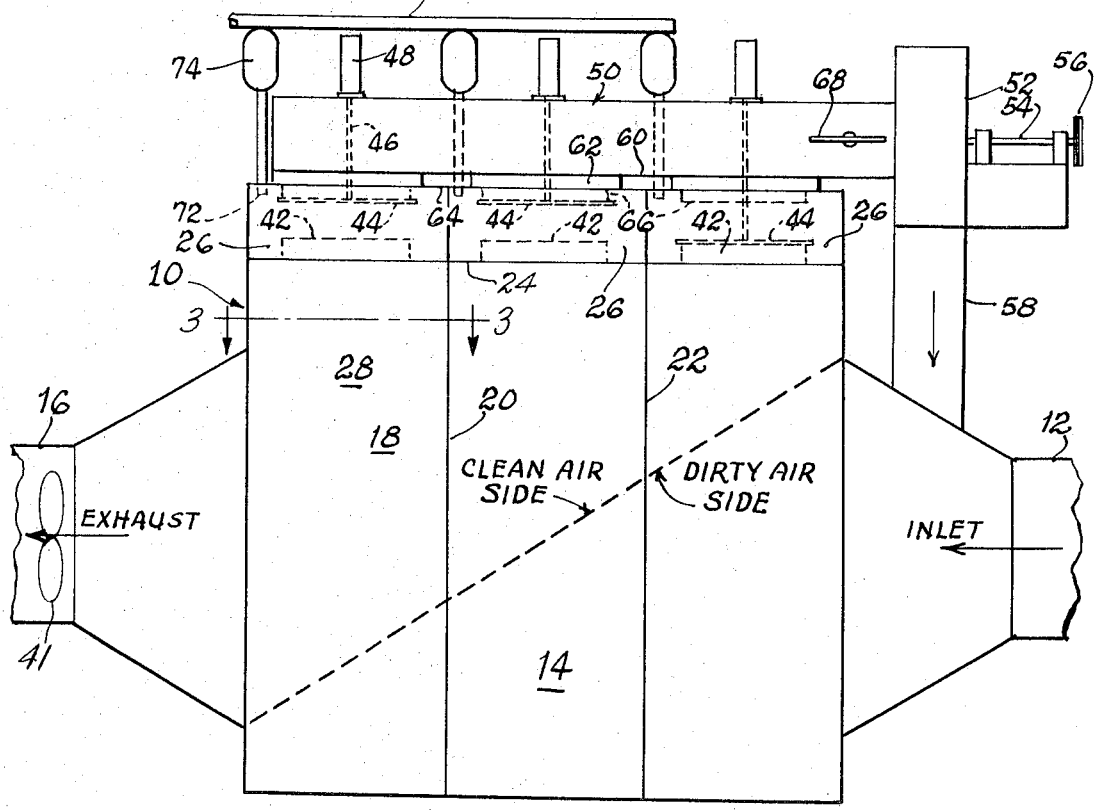
Figure 3:
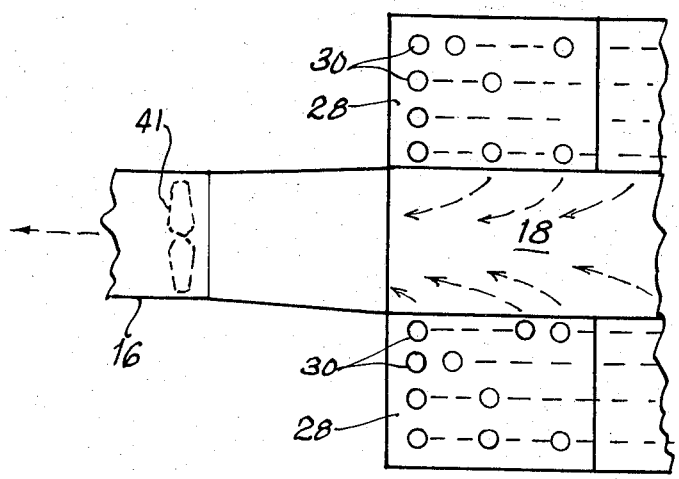

These and other objects and advantages of this invention will hereinafter appear, and for purposes of illustration, but not of limitation, an embodiment of the invention is shown in the accompanying drawing, in which FIG. 1 is an elevational view showing the interior of a filter device embodying the features of this invention; and FIG. 2 is a schematic sectional elevational view taken lengthwise of a three modules of the air filter section, and FIG. 3 is a sectional view taken along the line 3—3 of FIG. 2.

The invention will be described with reference to the more recently developed jet pulse principle for cleaning, but it will be understood that the concepts of this invention for scavenging the filtered gas immediately following initiation of the filter cycle will have application to others of the techniques for bag cleaning or removal of filter cake collected on the filter surface.

Referring now to the drawing for a detailed description of the device embodying the features of this invention, the numeral 10 indicates a housing having an inlet 12 at one side communicating with a dirty air plenum chamber 14, and an outlet 16 at the other side, communicating with a clean air plenum chamber 18. A plurality of laterally spaced apart separating walls 20 and 22 subdivide the housing into separate modules with a horizontally disposed top wall 24 subdividing each module into a module clean air chamber 26, at the upper end, and a bag house 28 in which the filter tubes 30 are suspended with the open ends 32 of the tubes coextensive with openings through the top wall 24, for communicating the interior of the tubes with the module clean air chamber 26.

The bottom end of each module is open for communication with the common dirty air plenum chamber 14, to enable the air or gas to be cleaned to pass upwardly from the dirty air plenum chamber into each module, into engagement with the filter tubes throughout their lengths. Immediately below the bottom side of the modules, the housing 10 is provided with a hopper 34 having walls which are inclined downwardly to a central outlet 36, having a trap door 38 to enable occasional removal of the collected dust and dirt, without interfering with filter flow.

The illustrated modification shows the housing 10 subdivided by walls 20 and 22 into three modules. It will be understood that the number of modules is not significant, in that the device can be constructed with but a single module or any number of additional modules, depending upon the size and capacity of the device.

The filter tubes are in the form of elongate cylindrical members, preferably though not necessarily formed of filter fabric, with the filter bag closed at the bottom and open at the top for communicating the interior of the bag with the module clean air chamber 26 through the contiguous openings in the top plate 24. The bags are fitted as stockings over a rigid open wire cage to hold the bags in their tubular position. The bags and cage are suspended from the top plate 24 by any number of fastening means, the detailed description of which need not be given, since the bags and the fastening means form no part of the invention and are well known in the trade.

Each module is formed with a central downpipe 40, the lower end of which communicates with exhaust 16, while the upper end portion extends upwardly through the top plate 24 and into the module clean air chamber 26, with the portion of the downpipe extending upwardly beyond the top plate providing a seat 42 for a module valve plate 44. The valve plate is mounted for movement in the vertical direction between raised and lowered positions which, when in lowered position, is dimensioned to span the open end of the downpipe 40 for blocking communication between the module clean air chamber and the exhaust and which, when in raised position, frees the downpipe 40 to enable the clean air to be exhausted from the module clean air chamber. Actuation of the valve plate 44 between raised and lowered positions is effected by conventional actuating means, such as a connecting rod 46 and an air cylinder or solenoid 48 and the like.

Extending continuously across the top of the housing, crosswise of the modules and in vertical alignment with the downpipe 40, is a scavenger hood 50 which communicates at one end with the ingoing side of an exhaust fan 52, having a drive shaft 54 with a sheave 56 for operation by a driving belt from a power source, but which may instead be driven by an electric motor or the like. The outgoing side of the exhaust fan is connected by a duct 58 to the inlet 12 to the housing 10 for recycle of air exhausted from the scavenger hood to the dirty air inlet plenum chamber 14.

The hood is formed with a bottom wall 60 having inlet openings 62 in vertical alignment with the openings to the downpipe 42 and the top wall 64 of the housing is provided with similar openings for communicating the interior of each module clean air chamber with the hood. The top wall of the module clean air chamber is provided with a downwardly extending rim 66 about each of the openings therein, to provide a seat for sealing engagement by the valve plate 44, when in raised position, to block communication between the scavenger hood 50 and the module clean air chamber.

In the hood, between the exhaust fan 52 and the last of the openings 62 communicating the scavenger hood with the modules, is provided a valve means mounted for movement between open and closed positions for blocking and cutting off communication between the exhaust fan and the hood when in closed position. In the illustrated modification, the valve means comprises a plate 68 mounted for rocking movement about a central pivot which can be actuated externally of the hood, or by motor means within the hood, for rocking the plate between open and closed positions. The plate is dimensioned and shaped to block the passage through the hood when rotated to closed position and to free the passage for flow of gases therethrough to the fan housing, when in open position.

To dislodge the filter cake by a pulse with or without stopping filter flow, a compressed air line 70 communicates a source of high pressure air with a nozzle 72 through a control valve 74. The nozzle may be arranged to direct a jet of high pressure air into each filter tube, through the open end. However, it will be sufficient if a nozzle is provided for each module to introduce a jet pulse of high pressure air into the module for passage downwardly through each of the filter tubes to dislodge the filter cake collected on the outer surfaces thereof in response to flexure. The valve 74 operates on signal to release a short burst of high pressure air into the open end of the filter tube or the module clean air chamber, as the case may be, for cleaning each of the filter tubes in the module.

Having defined the basic construction of the device embodying the features of this invention, description will now be made briefly with respect to the operation thereof.

During normal filtering operation, the module valve plates 44 are in their raised positions, providing communication between the module clean air chamber 26 and the downpipes 40 to the exhaust while blocking communication between the module clean air chamber and the scavenger hood 50. The exhaust fan 41 communicating with the outgoing side of the clean air plenum chamber draws the air to be cleaned through the inlet 12 and into the dirty air plenum chamber 14 and through the filter tubes 30. As air from the outside of the filter tubes is drawn through the filter tube, the dust, dirt or other solid particles are filtered out on the outer walls of the filter tubes, while the cleaned air passes through into the module clean air chamber 26 and out the exhaust 16.

When the filter cake of separated dust or dirt on the outer walls of the filter tubes, in any one module, has built up by an amount to cause an excessive pressure drop across the filter surface, it is desirable to dislodge the filter cake for cleaning the tubes in the module. For this purpose, the solenoid valve 48 is energized for displacement of the module valve plate 44 from raised position to lowered position, unblocking communication between the module clean air chamber 26 and the scavenger hood 50, while blocking communication between the module clean air chamber 26 and the exhaust 16. It will be understood that the module valve plate can be operated between raised and closed positions by separate actuating means and the separate valve plates can be employed, one for movement between blocking and unblocking position for the exhaust, and another between unblocking and blocking positions, respectively, to the scavenger hood.

When the downpipe 40 has been blocked and the opening to the scavenger hood has been freed, the cleaning cycle is initiated, as by actuation of a shaking device to shake the bags and dislodge the filter cake, reversing the direction of air or gas flow to effect filter cake removal, stopping filter flow and passing an air or gas bubble through the length of the filter bag for flexure to dislodge the filter cake, or by the jet pulse principle illustrated in the drawing. In this latter instance, compressed air is introduced through the nozzle 72 into the module and preferably from separate nozzles directly into the open end of each of the filter tubes, all with or without stopping normal filter flow. The jet pulse of high pressure air travels downwardly through the length of the filter tubes in the module to cause a flexing of the filter bags. This operates to dislodge the filter cake collected on the outer walls of the filter tubes, which, upon separation, fall gravitationally downwardly into the hopper 34 for disposal.

Concurrently with the closing of the downpipe and opening of the communication to the scavenger hood, the valve 68 opens to enable the air to flow from the module clean air chamber into the scavenger hood from which it is exhausted by the scavenger fan 52 for recycle to the dirty air plenum chamber for re-cleaning. Instead of recyling the scavenged air, it can be cycled to another filtering section or device.

The described flow is maintained during the jet pulse cleaning cycle and for a short period of time thereafter, corresponding to the portion of the cycle during which dirt and dust which has found its way through the filter tube would otherwise be included with the filtered air. As a result, such contaminated air is not exhausted through the clean air plenum chamber but instead is recycled in a recleaning operation.

After the lapse of a short period of time following the cleaning cycle (whichever method is used), the scavenger valve 68 is closed, shutting off communication between the scavenger hood and fan. The module valve 44 is raised to block off the scavenger hood and to reestablish communication with the clean air exhaust for return of the module "on stream" in the normal cleaning cycle.

Each time that the bags are cleaned, the recycle conditions are established to prevent the exhaust of contaminated air into the atmosphere or otherwise and to recycle such air for refiltering. It will be understood that such operations can be timed for effecting the cleaning cycle at regular intervals and in a desired sequence from the standpoint of module to module operation for returning the modules remaining on stream while taking one off for filter cake removal. Instead, all of the modules can be taken off simultaneously and put back on stream. However, it is preferred to sequence the modules for most efficient operation with continuous filter flow.

While the description has been made to the operation of a single module, it will be apparent that the same operation can be carried out with any number of modules in a device, all of which may be connected for operation with a single scavenger hood.

It will be understood that changes may be made in the details of construction, arrangement and operation without departing from the spirit of the invention, especially as defined in the following claims.

We claim:

1. In a filter device which makes use of a housing divided into a dirty gas chamber and a clean gas chamber, an inlet communicating with the dirty gas chamber and an outlet connected by a passage with the clean gas chamber, a plurality of filter tubes extending into the dirty gas chamber and withdrawal means communicating with the outlet to cause flow of gas from the dirty gas chamber through the filter tubes into the clean gas chamber and through the passage to the outlet with the separation of solid particles on the ingoing side of the filter tubes as the gas filters therethrough, and means operable periodically to dislodge collected particles from the ingoing side of the filter tubes during a cleaning cycle, the improvement which comprises a scavenger hood, a passage communicating the scavenger hood with the clean gas chamber, a gas withdrawal means in communication with the scavenger hood, valve means mounted for movement between blocking and unblocking position with respect to the passage communicating the clean gas chamber with the scavenger hood and unblocking and blocking positions respectively with respect to the passage communicating the clean gas chamber with the outlet, in such manner that when the valve means is in blocking position with respect to the scavenger passage, it is in unblocking position with respect to the outlet passage to enable gas to pass from the clean gas plenum chamber to the outlet while blocking passage to the scavenger hood, and when the valve means is in unblocking position with respect to the scavenger passage, it is in blocking position with respect to the outlet passage to enable gas to pass from the clean gas plenum chamber to the scavenger hood while blocking passage to the outlet while gas continues to flow in one direction from the dirty gas chamber, through the filter tubes and into the clean gas chamber and then from the clean gas chamber to the scavenger hood or the passage connecting the clean gas chamber with the outlet, depending upon the position of the valve means.

2. A filter device as claimed in claim 1 in which the filter tubes extend vertically into the dirty gas chamber with the tubes closed at their bottom ends and open at their top ends with the open ends in communication with the clean gas chamber.

3. A filter device as claimed in claim 1 in which the means operable periodically to dislodge particles collected on the ingoing side of the filter tubes comprises means for introducing a pulse of high pressure gas into the open ends of the filter tubes.

4. A filter device as claimed in claim 3 which comprises a source of high pressure gas, nozzle means communicating with the source and extending into the clean gas chamber, and valve means for controlling the issuance of a short burst of high pressure gas from the nozzle.

5. A filter device as claimed in claim 1 which includes vertical walls in the housing for subdividing the housing into a number of modules common with the dirty gas chamber, with each module having a separate passage communicating with the exhaust and a separate passage communicating with the scavenger hood.

6. In a filter device which makes use of a housing divided into a dirty gas chamber and a clean gas chamber, an inlet communicating with the dirty gas chamber and an outlet connected by a passage with the clean gas chamber, a plurality of filter tubes within the housing extending to within the dirty gas chamber and means to cause flow of gas from the dirty gas chamber through the filter tubes into the clean gas chamber with the separation of solid particles on the ingoing side of the filter tubes as the gas filters therethrough and means operative periodically to dislodge collected particles from the ingoing side of the filter tubes during a cleaning cycle, the improvement which comprises a scavenger hood, a passage communicating the scavenger hood with the clean gas chamber, a gas withdrawal means in communication with the scavenger hood, scavenger valve means mounted within said scavenger hood between the withdrawal means and the passage communicating the scavenger hood with the clean gas chamber for movement between open position to enable communication between said scavenger hood and the withdrawal means and closed position for blocking communication between said scavenger hood and withdrawal means, other valve means mounted for movement between blocking and unblocking position with respect to the passage communicating the clean gas chamber with the scavenger hood and with respect to the passage communicating the clean gas chamber with the outlet, such that at least during the initial portion of the filter cycle immediately following the cleaning cycle, said other valve means operates to block the passage communicating the clean gas chamber with the outlet and to unblock the passage between the clean gas chamber and the scavenger hood, and movement of the scavenger valve to open position, and after the cleaning cycle, said other valve means operates to unblock the passage communicating the clean gas chamber with the outlet and to block the passage between the clean gas chamber and the scavenger hood, and movement of the scavenger valve to closed position, which includes a return passage communicating withdrawal means with the dirty gas chamber for recycling the gas from the scavenger hood to the dirty gas chamber.

7. In a filter device which makes use of a housing divided into a dirty gas chamber and a clean gas chamber, an inlet communicating with the dirty gas chamber and an outlet connected by a passage with the clean gas chamber, a plurality of filter tubes within the housing extending to within the dirty gas chamber and means to cause flow of gas from the dirty gas chamber through the filter tubes into the clean gas chamber with the separation of solid particles on the ingoing side of the filter tubes as the gas filters therethrough, and means operative periodically to dislodge collected particles from the ingoing side of the filter tubes during a cleaning cycle, the improvement which comprises a scavenger hood, a passage communicating the scavenger hood with the clean gas chamber, a gas withdrawal means in communication with the scavenger hood, scavenger valve means mounted within said scavenger hood between the withdrawal means and the passage communicating the scavenger hood with the clean gas chamber for movement between open position to enable communication between said scavenger hood and the withdrawal means and closed position for blocking communication between said scavenger hood and withdrawal means, other valve means mounted for movement between blocking and unblocking position with respect to the passage communicating the clean gas chamber with the scavenger hood and with respect to the passage communicating the clean gas chamber with the outlet, such that at least during the initial portion of the filter cycle immediately following the cleaning cycle, said other valve means operates to block the passage communicating the clean gas chamber with the outlet and to unblock the passage between the clean gas chamber and the scavenger hood, and movement of the scavenger valve to open position, and after the cleaning cycle, said other valve means operates to unblock the passage communicating the clean gas chamber with the outlet and to block the passage between the clean gas chamber and the scavenger hood, and movement of the scavenger valve to closed position, which includes that the passage communicating the clean gas chamber with the outlet and the passage communicating the clean gas chamber with the scavenger hood are arranged in spaced face to face relation and in which said other valve means comprises a single valve means mounted for movement between said passages to open one and close the other during the filtering operation and to close the one and open the other during the cleaning operation and for a short period of time thereafter.

* * * * *